United States Patent [19]

Yoshida et al.

[11] Patent Number: 5,253,167
[45] Date of Patent: Oct. 12, 1993

[54] REMOTE MAINTENANCE/SUPERVISORY SYSTEM AND METHOD FOR AUTOMATED TELLER MACHINES

[75] Inventors: Yasuhisa Yoshida; Hiroaki Nakamura, both of Owariasahi, Japan

[73] Assignees: Hitachi, Ltd., Tokyo; Chubu Hitachi Electric Co., Ltd., Aichi, both of Japan

[21] Appl. No.: 536,468

[22] Filed: Jun. 12, 1990

[30] Foreign Application Priority Data

Jun. 15, 1989 [JP] Japan .................................. 1-153508

[51] Int. Cl.[5] ...................... G06F 15/20; G06F 15/30; H04N 7/18
[52] U.S. Cl. ................................... 364/408; 235/379; 902/6
[58] Field of Search ................... 364/408, 407, 551.01; 235/379; 902/6; 358/93, 108, 100; 371/15.1, 16.4

[56] References Cited

U.S. PATENT DOCUMENTS

| | | | |
|---|---|---|---|
| 2,909,107 | 10/1959 | Simjian | 902/6 |
| 4,636,947 | 1/1987 | Ward | 395/650 |
| 4,864,108 | 9/1989 | Hamada et al. | 235/379 |
| 4,969,035 | 11/1990 | Dawson | 358/100 |
| 4,991,008 | 2/1991 | Nama | 358/93 |
| 5,105,069 | 4/1992 | Hakenewerth et al. | 235/379 |

*Primary Examiner*—Donald E. McElheny, Jr.
*Assistant Examiner*—Xuong Chung
*Attorney, Agent, or Firm*—Antonelli, Terry, Stout & Kraus

[57] ABSTRACT

In a remote maintenance system for automated teller machine comprising an automated teller machine for performing automatic transaction of cash and a supervisory arrangement for remotely supervising the automated teller machine, imaging means for imaging the operational state inside the automated teller machine is provided in the automated teller machine, and in the supervisory arrnagement, means for displaying information indicative of a picture imaged by the imaging means and command means for commanding the automated teller machine to perform requisite operations are provided.

12 Claims, 3 Drawing Sheets

REMOTE MAINTENANCE/SUPERVISORY SYSTEM AND METHOD FOR AUTOMATED TELLER MACHINES

BACKGROUND OF THE INVENTION

The present invention relates to remote maintenance system and method for automated teller machines (ATM) and especially to simplification of repair of faults occurring during unattended operation of an ATM.

Conventionally, there is known a type of remote maintenance system for automated teller machines, as disclosed in JP-A-63-3368, for example.

The known system comprises an automated teller machine used in banking facilities, and a remote supervisory controller installed at a site remote from the automated teller machine. The automated teller machine and the remote supervisory controller are interconnected together by communication lines so that the remote supervisory controller may supervise and control the automated teller machine.

In the event that a fault occurs in the automated teller machine, the cause of generation of the fault and a position at which the fault occurs are displayed in the remote supervisory controller. In particular, for display of the fault occurrence position, the following procedure is undertaken.

Firstly, information indicative of a sectional drawing of the automated teller machine is stored in advance in the remote supervisory controller. Upon occurrence of a fault, the automated teller machine sends a fault occurrence position code to the remote supervisory controller. Then, the remote supervisory controller reads the sectional drawing information to display it together with the fault occurrence position.

While watching the display, the attendant tries to assist in automatic repair by manipulating the remote supervisory controller to issue commands to the automated teller machine.

SUMMARY OF THE INVENTION

In the prior art, information indicative of a fault occurring in the automated teller machine is coded and sent to the remote supervisory controller so as to be displayed and therefore the variety of faulty states to be displayed is limited. As a result, the prior art faces a problem that the attendant can not provide suitable commands complying with an actual defective state to the automated teller machine in which the fault occurs.

The present invention has for its object to obviate the aforementioned disadvantages encountered in the prior art and to provide a remote maintenance system and method for automated teller machines which can take measures against an actual faulty state properly in compliance therewith upon occurrence of a fault.

In a remote maintenance system for an automated teller machine according to the invention, imaging means is disposed inside an automated teller machine, so that a faulty state is imaged by the imaging means in the event of occurrence of a fault, and information indicative of an imaged picture is displayed in a remote supervisory controller.

Thus, the attendant, for example, can watch the displayed picture to grasp the defective condition accurately. The attendant can then select and send suitable commands to the automated teller machine in which the fault occurs.

In addition, the operational condition obtained under the direction of the control commands is fedback to the attendant to enable him to engage in removing the fault steadily while verifying the effects of the control commands.

DESCRIPTION OF THE PREFERRED EMBODIMENT

The invention will now be described by way of example with reference to the accompanying drawings.

Figure 1:
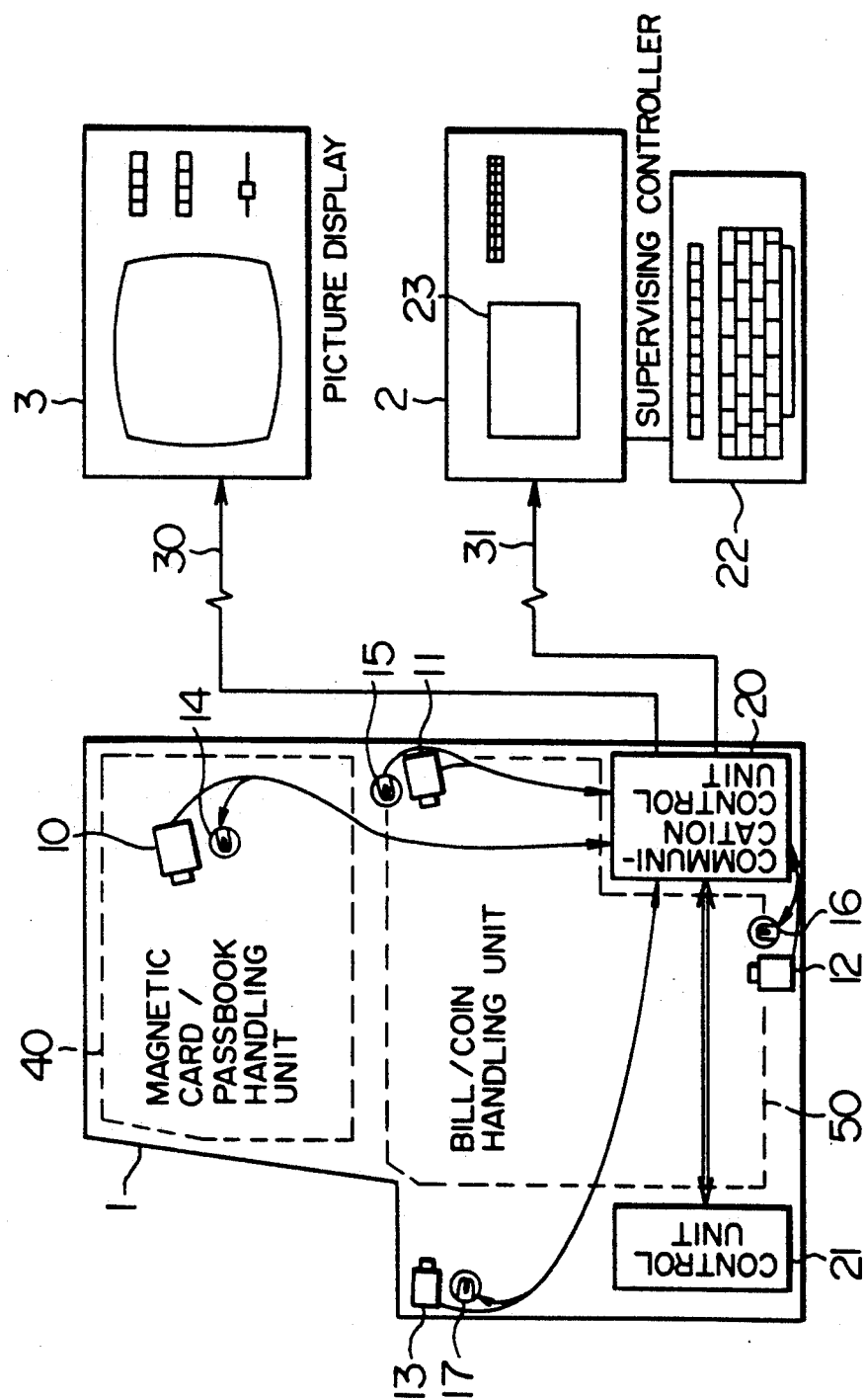
FIG. 1 is a diagram showing a remote maintenance/supervisory system for automated teller machine according to an embodiment of the invention.

As schematically shown in FIG. 1, a remote maintenance system according to an embodiment of the invention comprises an automated teller machine (hereinafter abbreviated as ATM) 1, a supervisory controller 2 and a picture display 3.

The supervisory controller 2 and picture display 3 are installed at a site remote from the ATM to supervise the operational state of the ATM.

The ATM 1 has a plurality of units including a magnetic card and passbook handling unit 40 for handling magnetic cards and passbooks, and a bill/coin handling unit 50 for handling receipt/payment of bills and coins. In the interiors of the magnetic card and passbook handling unit 40 and bill/coin handling unit 50 of the ATM 1, video cameras (hereinafter simply referred to as cameras) 10 to 13 for imaging pictures of various portions and lights for illumination of the cameras (hereinafter simply referred to as lights) 14 to 17 are installed at important places for the imaging purpose.

In FIG. 1, one camera is provided for the magnetic card and passbook handling unit 40 and two cameras for the bill/coin handling unit 50, but a greater number of cameras may be provided for each unit if more information on the operational state must be collected.

Pictures imaged by the cameras 10 to 13 are transmitted through a communication control unit 20 and a picture transmission line 30 to the picture display 3 and displayed thereon.

The ATM 1 also has a control unit 21 for controlling the overall operation of the ATM 1. The control unit 21 is operable to decide information sent from various sensors (not shown) provided in the ATM 1 to generate supervisory information indicative of, for example, a residual of bills, a transaction progress condition and a jam occurrence location and send the information to the supervisory controller 2 through the communication control unit 20 and a supervisory information control command transmission line 31. Responsive to the supervisory information, the supervisory controller 2 displays code information indicative of the operational condition of the ATM 1 and the contents of the fault on a display unit 23.

The supervisory controller 2 includes a command input unit 22 adapted to transmit various kinds of information to the ATM 1. More particularly, a control command inputted by means of the command input unit 22 is transmitted to the control unit 21 through the supervisory information control command transmission line 31 and communication control unit 20 included in the ATM 1 to enable the control unit 21 to control the operation of individual components of the ATM 1 on the basis of the control command.

Figure 2:
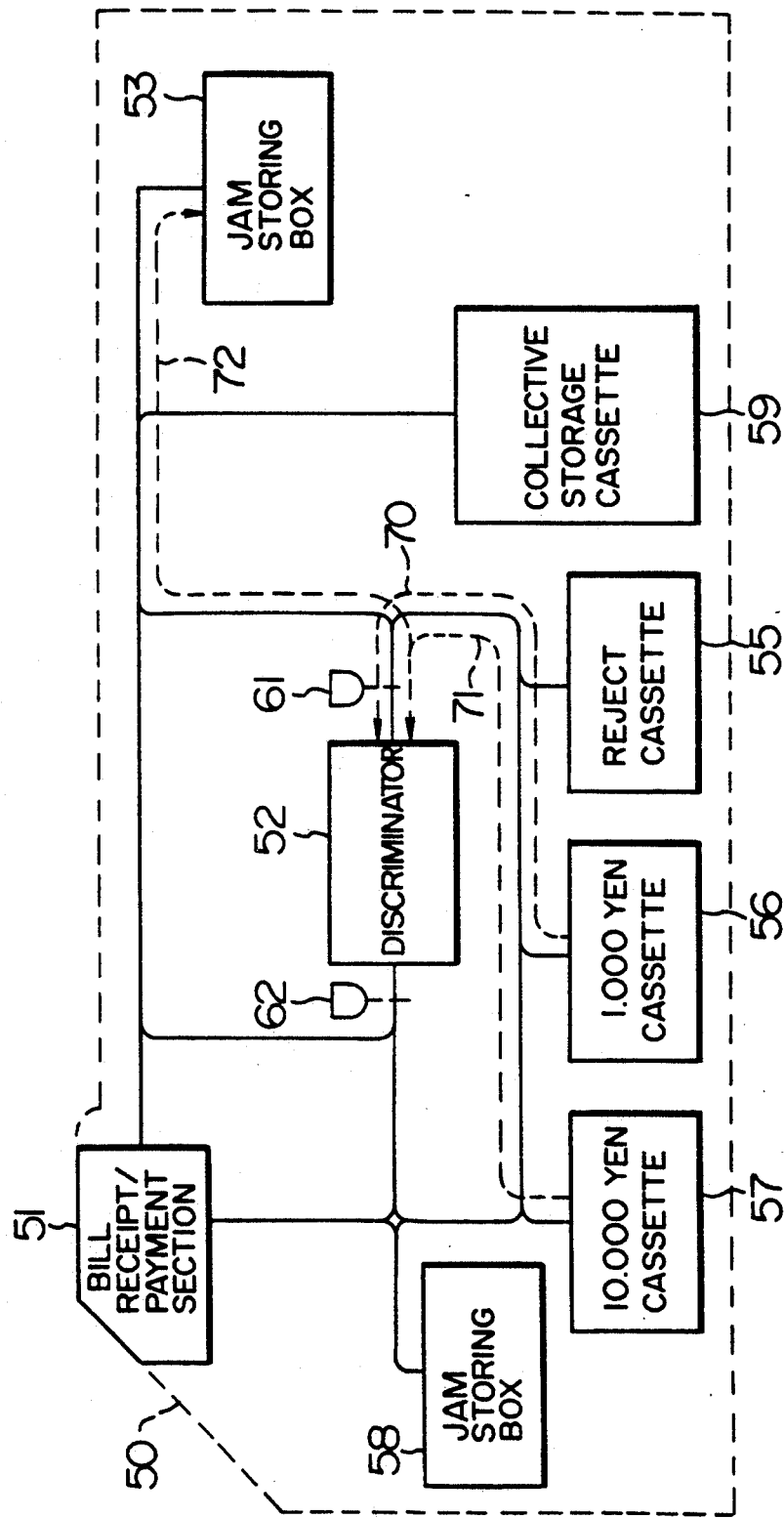
FIG. 2 is a block diagram showing details of a bill and coin handling unit provided in an automated teller machine.

Referring now to FIG. 2, the bill/coin handling unit 50 will be described in greater detail.

Reference numeral 51 designates a section for receiving and paying bills. Reference numeral 52 designates a discriminator for deciding the quality of bills or the kind thereof. Reference numerals 53 and 58 designate jam storing boxes for storing bills jammed along the way of bill conveyance. A single jam storing box may suffice, but the provision of a plurality of jam storing boxes can facilitate recovery of jammed bills. Reference numeral 55 designates a reject cassette for storing bills which are determined to be defective through decision by the discriminator 52. Reference numeral 56 designates a 1,000 yen cassette for storing 1,000 yen bills and 57 a 10,000 yen cassette for storing 10,000 yen bills. Denoted by 59 is a collective storage cassette for storing, for example, supplemental bills. Reference numeral 61 designates a discriminator entrance sensor for detecting a bill entering the discriminator 52, and 62 a discriminator exit sensor for detecting a bill discharged from the discriminator 52.

The operation of the bill/coin handling unit will now be described by way of example of payment. Bills are paid out of the 10,000 yen cassette 57 and 1,000 yen cassette sheet by sheet, conveyed in the direction of arrows 70 and 71 and checked for their quality in the discriminator 52. A bill determined to be passed in the checking is stored in the bill receipt/payment section 51 but a bill determined to be defective is stored in the reject cassette 55. Bills stored in the receipt/payment section 51 are discharged collectively to the outside of the unit.

Figure 3:
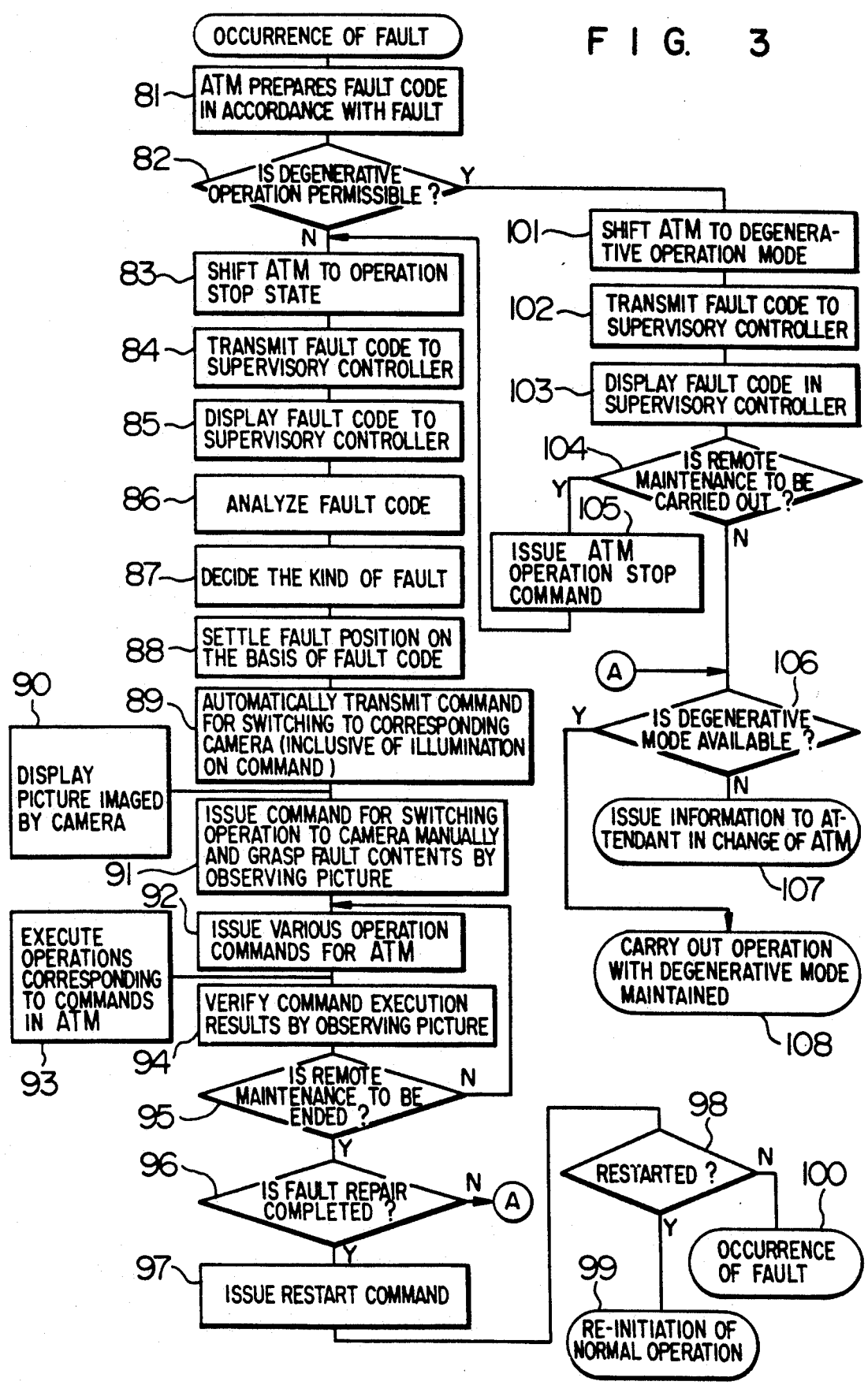
FIG. 3 is a flow chart showing the operational procedure undertaken by the remote maintenance/supervisory system in the event that a fault occurs in the automated teller machine.

In the event that a fault occurs in the ATM 1 of the system shown in FIG. 1, the system operates as will be described below in accordance with a flow chart of FIG. 3.

Upon occurrence of a fault in the ATM 1, the control unit 21 in the ATM 1 first prepares a fault code representative of a fault position, a sensor position, an operational condition and the like (step 81). Subsequently, the control unit 21 decides whether the ATM 1 can be operated in a degenerative fashion (step 82). The degenerative operation referred to herein signifies an operation mode wherein, upon occurrence of a fault in the ATM 1, the ATM 1 continues operating with a portion at which the fault occurs disconnected and only the rest of the ATM 1 being normally operated.

If it is determined in step 82 that the degenerative operation is not permissible, the ATM 1 proceeds to the operation stop state (step 83). Subsequently, the fault code prepared in step 81 as described previously is transmitted to the supervisory controller 2 through the communication control unit 20 and supervisory information control command transmission line 31 (step 84).

Receiving the fault code transmitted from the control unit 21, the supervisory controller 2 displays it on the display unit 23 (step 85). At that time, a buzzer or the like is sounded to alarm the attendant. Then, the fault code is analyzed (step 86) and the kind of the fault is decided (step 87). A fault occurrence position is then settled on the basis of the fault code (step 88). Then, a command for switching operation to a camera corresponding to the fault occurrence position is automatically transmitted to the control unit 21 of the ATM 1 through the supervisory information control command transmission line 31 and communication control unit 20 (step 89). At that time, the selected camera and associated light are instructed to be activated.

The aforementioned camera switching command derived from fault information contained in the fault code is for activating, for example, the camera 11 and light 15 installed in the bill/coin handling unit 50.

A picture imaged by the camera selected by the automatically transmitted camera switching command is transmitted through the communication control unit 20 and supervisory information control command transmission line 31 to the picture display 3 so as to be displayed thereon (step 90). Observing the displayed picture, the attendant manipulates the command input unit 22 of the supervisory controller 22 to input or issue a command for switching operation to a camera effective to image a further necessary picture and thereafter grasp the contents of the fault accurately by observing the picture imaged by the secondly selected camera (step 91).

When the defective condition in the ATM 1 is grasped accurately in this manner, the attendant identifies a working portion of the ATM 1 necessary for repair of the fault and manipulates the command input unit 22 of the supervisory controller 2 to input or issue operation commands for commanding operations necessary to repair the fault, the commands being transmitted to the control unit 21 of the ATM 1 (step 92).

The control unit 21 of the ATM 1 then executes an operation processing corresponding to the transmitted command (step 93). Subsequently, the attendant verifies the results of the operations executed in the ATM 1 on the basis of the operation commands in step 93 by observing a picture displayed on the picture display (step 94).

It is decided on the basis of the results of the verification executed in step 94 whether the remote maintenance should be ended (step 95).

If the results of the decision executed in step 95 indicate that, for example, the fault is not repaired completely yet and a further operation command needs to be issued, the procedure returns to step 92 and the operation command is again issued.

If the results of decision in step 95 indicate that the remote maintenance should end, completion of repair of the fault is decided (step 96). If the completion of repair of the fault is determined, the supervisory controller 2 issues a re-start command (step 97) and it is decided whether the ATM 1 is to be re-started (step 98). If the ATM 1 is re-started, normal operation is re-initiated (step 99 but if the ATM 1 is not restarted, the procedure for fault occurrence is again undertaken (step 100).

If in step 96 the repair of the fault is determined not to be completed, it is decided in step 106 whether the degenerative mode is available.

Reverting to step 82, if the degenerative operation is determined to be permissible, the ATM 1 moves to the degenerative operation mode (step 101).

Then, the fault code is sent to the supervisory controller 22 (step 102) and displayed on the display unit 23 of the supervisory controller (step 103). Subsequently, it is decided whether the remote maintenance is to be carried out (step 104) and if the remote maintenance is to be carried out, an ATM operation stop command is issued (step 105). If the results of the decision step 104 indicate that the remote maintenance is not carried out, it is decided whether the degenerative mode is available (step 106) and if available, the operation is carried out with the degenerative mode maintained (step 108). But if unavailable, information to this effect is issued to the attendant in charge of the ATM 1 (step 107).

A fault occurring in the ATM 1 can be detected, as will be described below, by referring to an instance of jam of bills. When considering that bills are jammed in the discriminator 52 of FIG. 2, the discriminator entrance sensor 61 detects the entrance of a bill into the discriminator, but the discriminator exit sensor 62 does not detect the discharge of the bill from the discriminator within a predetermined interval of time, thereby enabling the control unit 21 to know that the bill is not conveyed normally.

Thus, in the event of occurrence of a fault involving a bill jam as mentioned above, a command is issued from the supervisory controller 2 and such an operation as described below is executed in the ATM 1 on the basis of the command. More particularly, a jammed bill is removed from the jam location and stored in the jam storing box 53 in the direction of, for example, arrow 72 shown in FIG. 2. If a received bill is jammed, it may be returned at once to the customer.

In order to remove the jammed bill from the jam location, a belt operating as a bill conveyance mechanism may be driven backwardly.

In the foregoing embodiment, the picture transmission line and the supervisory control information transmission line are provided separately, but they may be united into a single line for multiplexed transmission. Further, the picture display 3 and the supervisory controller 2 attached with command input unit 22 may obviously be united into a single arrangement.

Moreover, a single remote controller arrangement comprised of the picture display 3 and the supervisory controller 2 attached with command input unit 22 may be connected with a plurality of ATM's to handle them. In this case, in the event that a fault occurs in any one of the plurality of ATM's, a camera corresponding to a location at which the fault occurs may be selected, a picture imaged by the camera may be displayed on the picture display in the remote control arrangement, and the operation of the one of the plurality of ATM's may be controlled on the basis of the displayed picture.

In addition, in place of the belt provided in the bill conveyance mechanism, robot hands may be provided in the bill/coin handling unit 50 and may be controlled remotely to perform more delicate operations.

Furthermore, a camera movable inside the ATM may be provided in the ATM 1 and the fault condition may be monitored by means of the movable camera.

While in the foregoing embodiment the invention has been described as applied to the ATM, the present invention is not limited thereto and obviously may also be applicable to machines dedicated to bill payment or coin handling machines.

We claim:

1. A remote maintenance system for an automated teller machine comprising:
   an automated teller machine for performing automatic transaction of cash; and
   a supervisory arrangement for remotely supervising said automated teller machine,
   said automated teller machine including imaging means for imaging the operational state inside said automated teller machine, and said supervisory arrangement including means for displaying information indicative of a picture imaged by said imaging means, and command means for commanding said automated teller machine to perform a fault removing operation.

2. A remote maintenance system for automated teller machine according to claim 1 wherein a plurality of imaging means are installed at a plurality of locations inside said automated teller machine, and said command means includes means responsive to commands for selecting at least one of said plurality of imaging means.

3. A remote maintenance system for automated teller machine according to claim 1 wherein said automated teller machine is comprised of a plurality of operation units, at least one imaging means is provided in association with each of said operation units, and said command means includes means responsive to commands for selecting said imaging means associated with individual units independently of each other.

4. A remote maintenance system for automated teller machine comprising:
   an automated teller machine for performing automatic transaction of cash; and
   a supervisory arrangement for remotely supervising said automated teller machine,
   said automated teller machine including a plurality of imaging means, installed at a plurality of locations inside said teller machine, for imaging the operational state inside said teller machine, fault detection means for detecting that a fault occurs in said teller machine, and fault information preparation means for preparing fault information concerning the fault detected by said fault detection means, and said supervisory arrangement including command means for commanding, on the basis of the fault information prepared by said fault information preparation means, the selection of at least one of said plurality of imaging means, and display means for displaying information indicative of a picture imaged by said selected imaging means.

5. A remote maintenance system for automated teller machine according to claim 4 wherein said command means is provided in said automated teller machine.

6. A remote maintenance system for automated teller machine according to claim 4 wherein said command means commands said automated teller machine to perform a fault removing operation.

7. A method of remotely maintaining an automated teller machine in a system comprised of said automated teller machine for performing automatic transaction of cash, said teller machine having at least one imaging means provided internally thereof, and a supervisory arrangement for remotely supervising said automated teller machine, said method comprising the steps of:
   imaging the operational state inside said automated teller machine by means of said imaging means;
   performing display of information indicative of a picture imaged by said imaging means in said supervisory arrangement; and
   commanding, from said supervisory arrangement, said automated teller machine to perform a fault removing operation.

8. A method of remotely maintaining an automated teller machine in a system comprised of said automated teller machine for performing automatic transaction of cash, said teller machine having a plurality of imaging means provided internally thereof, and a supervisory arrangement for remotely supervising said automated teller machine, said method comprising the steps of:

- detecting a fault occurring in said automated teller machine;
- preparing information concerning the detected fault;
- selecting one of said plurality of imaging means on the basis of the prepared fault information; and
- performing display of information indicative of a picture imaged by said selected imaging means.

9. A remote maintenance method for automated teller machine according to claim 8 further comprising commanding said automated teller machine to perform operations necessary to repair said fault.

10. A remote maintenance system for an automated teller machine comprising:

- an automated teller machine (ATM) for performing automatic transaction of cash; and
- a supervisory arrangement for remotely supervising said ATM;
- said ATM including:
- a plurality of camera means for imaging locations inside said ATM and for transmitting an image signal to said supervisory arrangement; and
- control means for controlling operation of said ATM;
- said supervisory arrangement including:
- display means for displaying the image signal transmitted from said ATM; and
- command means for transmitting a command to said control means in said ATM.

11. A remote maintenance system for an automated teller machine comprising:

- an automated teller machine (ATM) for performing automatic transaction of cash; and
- a supervisory arrangement for remotely supervising said ATM;
- said ATM including:
- a plurality of camera means for imaging locations inside said ATM and for transmitting an image signal to said supervisory arrangement; and
- control means for controlling operation of said ATM, said control means forming a fault code in response to occurrence of a fault and transmitting said fault code to said supervisory arrangement;
- said supervisory arrangement including:
- command means for analyzing said fault code from said control means and transmitting a command for switching one of said camera means according to said fault code to said ATM; and
- display means for displaying the image inside said ATM on the basis of the image signal transmitted from said ATM; and
- said control means including means for selecting one of said camera means in response to said command from said command means for changing the camera means which transmits said image signal.

12. A remote maintenance system for automated teller machine according to claim 11, wherein said ATM includes a plurality of operation units, each of said plurality of camera means being provided in association with one of said operation units, and each of said camera means imaging a portion inside the corresponding one of said operation units.

* * * * *